(12) United States Patent
Yamanashi et al.

(10) Patent No.: US 9,846,803 B2
(45) Date of Patent: Dec. 19, 2017

(54) MAKEUP SUPPORTING DEVICE, MAKEUP SUPPORTING SYSTEM, MAKEUP SUPPORTING METHOD, AND NON-TRANSITORY COMPUTER-READABLE RECORDING MEDIUM

(71) Applicant: Panasonic Intellectual Property Management Co., Ltd., Osaka (JP)

(72) Inventors: Tomofumi Yamanashi, Kanagawa (JP); Rieko Asai, Osaka (JP); Aoi Muta, Osaka (JP); Chie Nishi, Osaka (JP); Kaori Ajiki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 262 days.

(21) Appl. No.: 14/715,610

(22) Filed: May 19, 2015

(65) Prior Publication Data

US 2015/0254501 A1    Sep. 10, 2015

Related U.S. Application Data

(63) Continuation of application No. PCT/JP2014/004219, filed on Aug. 19, 2014.

(30) Foreign Application Priority Data

Aug. 30, 2013    (JP) ................. 2013-179673

(51) Int. Cl.
*G06K 9/00*    (2006.01)
*G06T 11/60*   (2006.01)
(Continued)

(52) U.S. Cl.
CPC ....... *G06K 9/00268* (2013.01); *A45D 44/005* (2013.01); *G06K 9/00281* (2013.01); *G06T 11/60* (2013.01); *H04N 7/18* (2013.01)

(58) Field of Classification Search
CPC ....... G06K 9/00268; H04N 7/18; G06T 11/60
(Continued)

(56) References Cited

U.S. PATENT DOCUMENTS

2002/0071604 A1* 6/2002 Orpaz ............... A45D 44/005
                                                    382/162
2012/0044335 A1* 2/2012 Goto ................ A45D 44/005
                                                    348/77

FOREIGN PATENT DOCUMENTS

EP     1710746       10/2006
JP     2001-346627   12/2001
(Continued)

OTHER PUBLICATIONS

The Extended European Search Report dated Aug. 12, 2016 for the related European Patent Application No. 14839288.9.
(Continued)

*Primary Examiner* — Tung Vo
*Assistant Examiner* — Zaihan Jiang
(74) *Attorney, Agent, or Firm* — Greenblum & Bernstein, P.L.C.

(57) ABSTRACT

A makeup supporting device includes: a makeup presentation unit that generates a simulation image by superimposing a makeup image on an image obtained by photographing a face, the makeup image indicating a state in which makeup is applied to the face; a makeup correction unit that receives correction of the makeup image included in the generated simulation image from a user; and a correction information recording unit that records correction information which indicates a region of a post-correction makeup image using a relative position to a facial feature points.

10 Claims, 18 Drawing Sheets

(51) Int. Cl.
*H04N 7/18* (2006.01)
*A45D 44/00* (2006.01)

(58) Field of Classification Search
USPC .......................................................... 348/78
See application file for complete search history.

(56) References Cited

FOREIGN PATENT DOCUMENTS

| | | |
|---|---|---|
| JP | 2003-044837 | 2/2003 |
| JP | 2004-094917 | 3/2004 |
| JP | 2007-175384 | 7/2007 |
| JP | 2007-257165 | 10/2007 |

OTHER PUBLICATIONS

International Search Report of PCT application No. PCT/JP2014/004219 dated Nov. 25, 2014.

* cited by examiner

| MAKEUP PATTERN (431) | MAKEUP ID (432) |
|---|---|
| MP1 | FM1, FM2 |
| MP2 | FM2, FM3 |
| MP3 | FM4, FM5 |
| ⋮ | ⋮ |

| MAKEUP ID (441) | MAKEUP TYPE (442) | COLOR (443) | DENSITY (444) | AREA (445) |
|---|---|---|---|---|
| FM1 | T1 | C1 | D1 | A1 |
| FM1 | T2 | C2 | D2 | A2 |
| FM1 | T3 | C3 | D3 | A3 |
| ⋮ | ⋮ | ⋮ | ⋮ | ⋮ |

| FACIAL COMPONENT ID (521) | FACIAL FEATURE POINT ID (522) | FACIAL FEATURE POINT POSITION (523) | PERSON ID (524) |
|---|---|---|---|
| P1 | F1 | X1, Y1 | H1 |
| P1 | F2 | X2, Y2 | H2 |
| ⋮ | ⋮ | ⋮ | ⋮ |

| FACIAL COMPONENT ID (531) | FACIAL REFERENCE POINT ID (532) | FACIAL REFERENCE POINT POSITION (533) | CORRECTION DATUM POSITION (534) | PERSON ID (535) |
|---|---|---|---|---|
| P1 | R1 | X1, Y1 | X1, Y1 | H1 |
| P1 | R2 | X2, Y2 | X1, Y1 | H1 |
| ⋮ | ⋮ | ⋮ | ⋮ | ⋮ |

| FACIAL COMPONENT ID ⌒551 | FACIAL REFERENCE POINT ID ⌒552 | POSITIONAL DIFFERENCE ⌒553 | PERSON ID ⌒554 |
|---|---|---|---|
| P1 | R1 | D1 | H1 |
| P1 | R2 | D2 | H1 |
| ⋮ | ⋮ | ⋮ | ⋮ |

MAKEUP SUPPORTING DEVICE, MAKEUP SUPPORTING SYSTEM, MAKEUP SUPPORTING METHOD, AND NON-TRANSITORY COMPUTER-READABLE RECORDING MEDIUM

BACKGROUND

1. Field of the Invention

The present disclosure relates to a makeup supporting device, a makeup supporting system, a makeup supporting method, and a non-transitory computer-readable recording medium for supporting facial makeup.

2. Description of the Related Art

Nowadays, a way of facial makeup (hereinafter, simply referred to as "makeup") is diversifying. It is difficult, particularly for a person who has insufficient knowledge about the makeup, to select proper makeup from countless options. This is because it takes an enormous amount of time and effort to actually try every makeup to determine and compare the makeup.

In view of the above, for example, PTLs 1 and 2 disclose technologies for generating and presenting a simulation image of a face when the makeup is applied. In the technologies of PTLs 1 and 2, there is acquired an image obtained by photographing a face of a makeup target (hereinafter, simply referred to as "face") (hereinafter, such an image is referred to as a "facial image"). In the technologies of PTLs 1 and 2, an image indicating a makeup state in which the makeup is applied to the face (hereinafter, referred to as a "makeup image") is superimposed on the facial image to generate a simulation image and display the generated simulation image. Hereinafter, the generation and display of the simulation image is referred to as a "makeup simulation".

In the technology of PTL 1, a setting of correction concerning the makeup image included in the displayed simulation image can be received from a user.

According to the technologies of PTLs 1 and 2 (hereinafter, referred to as "conventional technologies"), suitability of the makeup can be determined without actually applying the makeup. That is, the proper makeup can be selected with less time and effort. According to the conventional technologies, the user can easily perform the makeup simulation with respect to the makeup in which default makeup prepared as a makeup simulation target is corrected (hereinafter, referred to as "corrected makeup").

Incidentally, the corrected makeup may include a corrected makeup that another user wants to try. For example, there is a corrected makeup created by a famous makeup artist or a corrected makeup that is performed by many users to be becoming a new fashion.

CITATION LIST

Patent Literatures

PTL 1: Unexamined Japanese Patent Publication No. 2001-346627

PTL 2: Unexamined Japanese Patent Publication No. 2007-175384

PTL 3: Unexamined Japanese Patent Publication No. 2003-44837

PTL 4: Unexamined Japanese Patent Publication No. 2007-257165

However, in the conventional technologies, the corrected makeup created by a user is hardly applied to another user. This is because a size, a shape, and an arrangement of a facial component depend on the user, which results in a problem of how to paste the makeup image of the corrected makeup into the facial image of another user.

SUMMARY OF THE INVENTION

One non-limiting and exemplary embodiment provides a makeup supporting device, a makeup supporting system, a makeup supporting method, and a non-transitory computer-readable recording medium for being able to simply apply the corrected makeup created by a user to another user.

In one general aspect, the techniques disclosed here feature a makeup supporting device includes: a makeup presentation unit that generates a simulation image by superimposing a makeup image on an image obtained by photographing a face, the makeup image indicating a state in which makeup is applied to the face; a makeup correction unit that receives correction of the makeup image included in the generated simulation image from a user; and a correction information recording unit that records correction information which indicates a region of a post-correction makeup image using a relative position to facial feature points.

The present disclosure can simply apply the corrected makeup created by a user to another user.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

It should be noted that general or specific embodiments may be implemented as a system, a method, an integrated circuit, a computer program, a storage medium a, or any selective combination thereof.

BRIEF DESCRIPTION OF DRAWINGS

FIG. 5 is a view illustrating an example of contents of a makeup table according to the second exemplary embodiment;

FIG. 6 is a view illustrating an example of contents of a makeup information table according to the second exemplary embodiment;

FIG. 15 is a view illustrating an example of facial feature point information generated according to the second exemplary embodiment;

FIG. 16 is a view illustrating an example of facial reference point information generated according to the second exemplary embodiment;

FIG. 19 is a view illustrating an example of correction information recorded according to the second exemplary embodiment.

DETAILED DESCRIPTION

Exemplary embodiments of the present disclosure will be described in detail below with reference to the drawings.

First Exemplary Embodiment

A first exemplary embodiment of the present disclosure is an example of a basic mode of the present disclosure.

Figure 1:
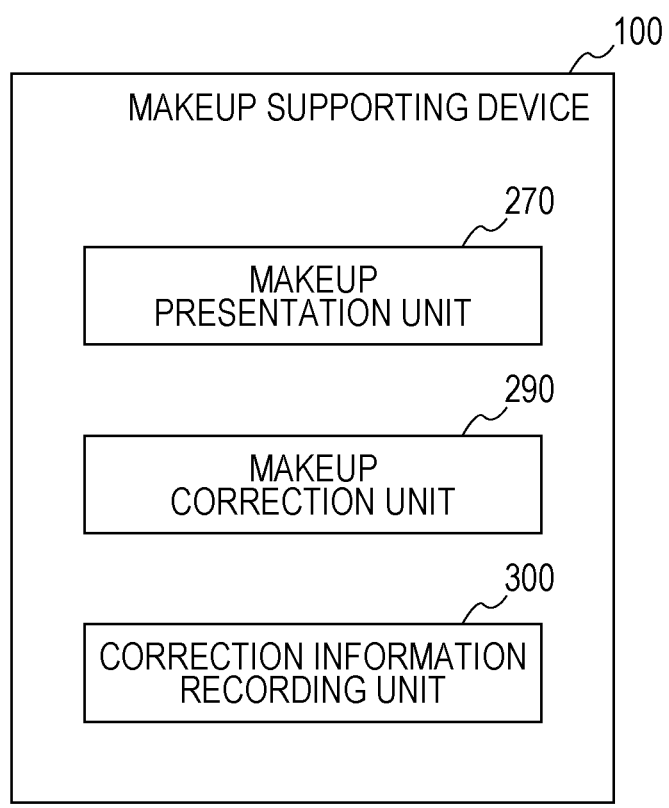
FIG. 1 is a block diagram illustrating an example of a configuration of a makeup supporting device according to a first exemplary embodiment of the present disclosure.

FIG. 1 is a block diagram illustrating an example of a configuration of the makeup supporting device according to the first exemplary embodiment.

Referring to FIG. 1, makeup supporting device 100 includes makeup presentation unit 270, makeup correction unit 290, and correction information recording unit 300.

Makeup presentation unit 270 generates the simulation image by superimposing the makeup image indicating a makeup state in which the makeup is applied to a face on an image obtained by photographing the face.

Makeup correction unit 290 receives correction concerning a makeup image included in the generated simulation image from a user.

Correction information recording unit 300 records correction information. In the correction information, a region of a post-correction makeup image is indicated using a relative position to facial feature points.

Although not illustrated, for example, makeup supporting device 100 includes a CPU (Central Processing Unit), a storage medium such as a ROM (Read Only Memory) in which a control program is stored, and a working memory such as a RAM (Random Access Memory). In this case, the CPU executes the control program to implement a function of each of the above units.

In makeup supporting device 100, the region of the makeup image of the corrected makeup created by a user can be recorded using the relative position to the facial feature points. Usually, the facial feature point includes information that can be acquired from the face irrespective of an individual difference of a size, a shape, and an arrangement of a facial component. Accordingly, makeup supporting device 100 can simply apply the corrected makeup created by a user to another user.

Second Exemplary Embodiment

A second exemplary embodiment of the present disclosure is an example of a specific mode of the present disclosure. The second exemplary embodiment is an example in which the present disclosure is applied to a device including a digital video camera and a touch-panel-equipped display.

DESCRIPTION OF TERMS

Terms used in the second exemplary embodiment will now be described.

"Facial components" mean parts constituting the face such as an eye, an eyebrow, a nose, a cheekbone, a lip, and a contour.

A "facial component ID" means identification information on each of the facial components.

"Facial feature points" mean feature points of facial components such as an inner end of an eyebrow, an outer end of the eyebrow, an inner corner of an eye, and an outer corner of the eye on an image or an actual space.

A "facial feature point ID" means identification information on each of the facial feature points.

"Makeup" means makeup ways (kinds), such as eyebrow-paint and eye shadow, which correct an impression of a feature of the facial components to enhance appearance, and the makeup includes at least a dye color, an application density, and an application area.

"Makeup information" means information indicating details of the makeup, and includes at least information (information indicating a difference from a facial color) necessary for the generation of the image, in which the makeup is applied to the face, from the facial image.

"Makeup types" mean makeup kinds including "foundation", "eyebrow-paint", "eye shadow", "lipstick", and "cheek makeup", which are distinguished by a positional relationship with at least the facial components.

A "makeup ID" means identification information on the makeup.

A "makeup image" means an image indicating a makeup state in which the makeup is applied to the face.

<Configuration of Makeup Supporting Device>

A configuration of the makeup supporting device according to the second exemplary embodiment will be described below.

Figure 2:
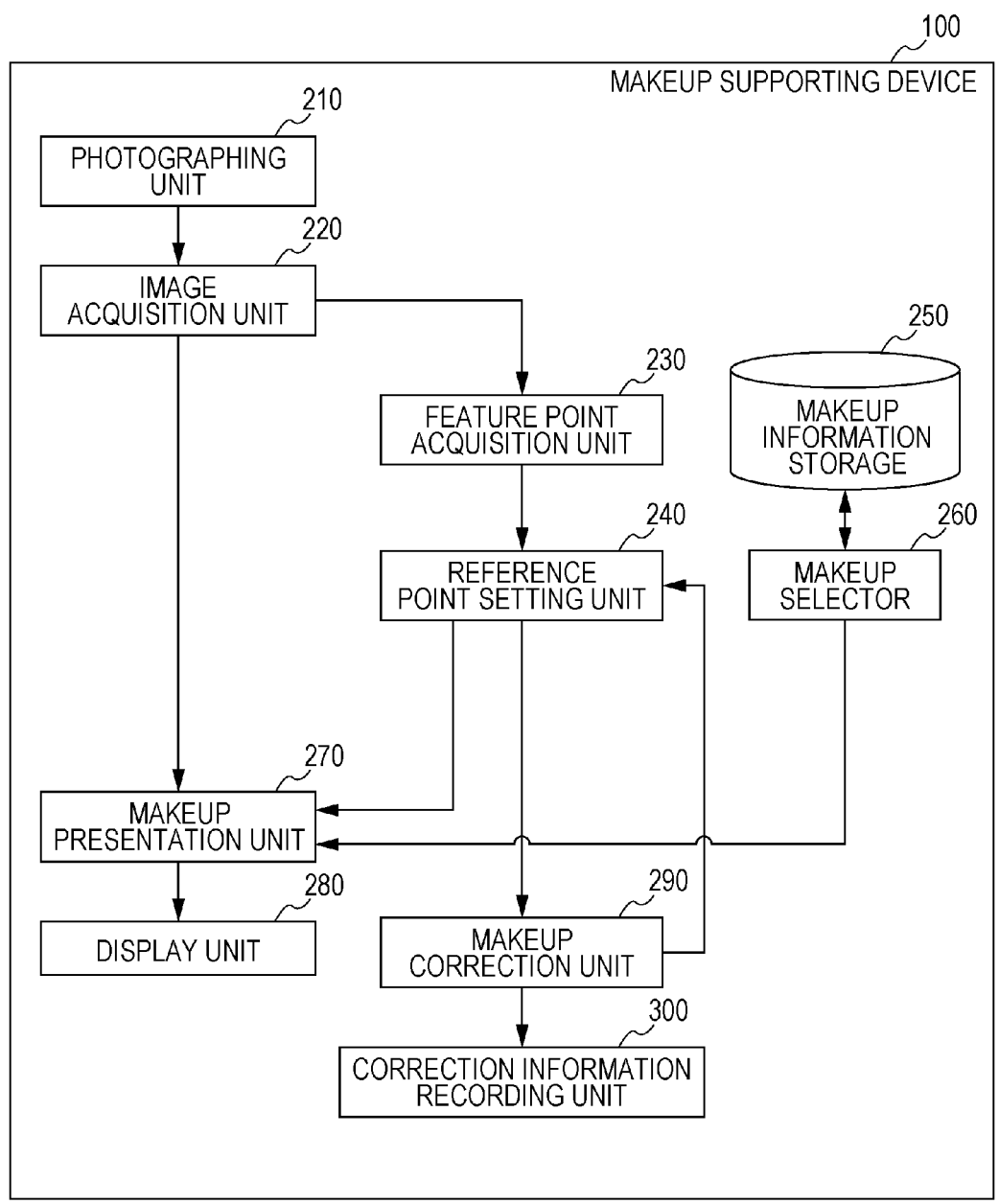
FIG. 2 is a block diagram illustrating an example of a configuration of a makeup supporting device according to a second exemplary embodiment of the present disclosure.

FIG. 2 is a block diagram illustrating an example of the configuration of the makeup supporting device according to the second exemplary embodiment.

Referring to FIG. 2, makeup supporting device 100 includes photographing unit 210, image acquisition unit 220, feature point acquisition unit 230, reference point setting unit 240, makeup information storage 250, makeup selector 260, makeup presentation unit 270, display unit 280, makeup correction unit 290, and correction information recording unit 300.

An example of photographing unit 210 includes a digital video camera, and photographing unit 210 photographs a video image of the face becoming a makeup simulation target. Photographing unit 210 then outputs the photographed video image to image acquisition unit 220. The video image includes a plurality of time-series images (frame images). In the second exemplary embodiment, it is assumed that the face becoming the makeup simulation target is a face of a user using makeup supporting device 100.

Image acquisition unit 220 sequentially acquires the images constituting the video image from the input video image. Image acquisition unit 220 then outputs the acquired image (hereinafter, referred to as a "photographed image") to position acquisition unit 230 and makeup presentation unit 270. Herein, image acquisition unit 220 desirably performs image processing of mirror-reversing the photographed image in order to give the user a feeling of applying the makeup while looking into a mirror. In addition, the photographed image includes a part of the image of the face becoming the makeup simulation target (hereinafter, referred to as a "facial image").

Feature point acquisition unit 230 acquires facial feature points of each of the facial components from the input photographed image. For example, the facial feature points are acquired by matching each partial region of the photographed image with a template image of each of previously-prepared facial components in which the positions of the facial feature points are set (for example, see PTL 3). Feature point acquisition unit 230 then outputs the facial feature point information to reference point setting unit 240. As used herein, the facial feature point information means information indicating the identification information and the position of each of the acquired facial feature points. The facial feature points are described in detail later.

Note that, the facial image is not limited to the image obtained by photographing the face from the front. Therefore, makeup supporting device 100 may properly deform the template image of the facial components according to an orientation of a user's face, and perform the matching between the post-deformation template image and the photographed image. In this case, for example, makeup supporting device 100 includes a detector that detects the orientation of the face included in the photographed image from the photographed image. Therefore, makeup supporting device 100 can flexibly follow movement of the user's face, and acquire the facial feature points from the facial image.

Based on a rule that is previously set using the facial feature points acquired from the photographed image as a reference, reference point setting unit 240 sets facial reference points to the facial image. As used herein, the facial reference points mean points used to fix a position of a region of the makeup image, and mean target points to which makeup reference points are adjusted (to be described later). Reference point setting unit 240 then outputs facial reference point information to makeup presentation unit 270 and makeup correction unit 290. As used herein, the facial reference point information means information indicating the identification information and the position of the set facial feature point.

In the second exemplary embodiment, reference point setting unit 240 sets initial positions of the facial reference points to the positions of the facial feature points. In the case where correction information is input from makeup correction unit 290 to be described later (that is, after correction is set), reference point setting unit 240 sets the positions of the facial reference points again according to the correction information.

Makeup information storage 250 stores a makeup table and a makeup information table. The makeup table defines a plurality of makeup patterns that are makeup patterns of the whole face. In the makeup information table, the makeup information is described in each makeup type constituting the makeup pattern. The makeup information means information in which details of makeup are described while associated with the facial component region (the positions of the facial feature points). Contents of the makeup table and the makeup information table are described in detail later.

In the second exemplary embodiment, the makeup information means information in which details of makeup are described while associated with the facial feature points. More specifically, the makeup information indicates the region of a default makeup image before performing correction (to be described later) using the relative position to the facial feature points. More specifically, the makeup information indicates the position of the makeup reference points relative to the region of the makeup image. As used herein, the makeup reference points mean target points which are adjusted to the facial reference points set in the facial image relative to the makeup image. That is, the facial reference points and the makeup reference points are datum points of the position in the region of the makeup image relative to the facial image.

Makeup selector 260 receives a user's selection manipulation to select one makeup pattern from the plurality of pieces of makeup described in the makeup information table. For example, the selection manipulation is performed through the touch-panel-equipped display. Makeup selector 260 acquires the makeup information on the selected makeup from the makeup information table, and outputs the makeup information to makeup presentation unit 270.

Makeup presentation unit 270 generates the simulation image to be obtained by superimposition of the makeup image of the selected makeup based on the makeup information. More specifically, makeup presentation unit 270 adjusts the positions of the makeup reference points of the makeup image to the positions of the set facial reference points to fix the region of the makeup image relative to the facial image. Makeup presentation unit 270 then outputs the generated simulation image to display unit 280. A simulation image generating technique is described in detail later.

For example, display unit 280 includes a display part of the touch-panel-equipped display. Display unit 280 displays the simulation image based on image data of the input simulation image. More specifically, display unit 280 sequentially displays the simulation image along the photographed video image.

Makeup correction unit 290 receives the correction concerning the makeup image included in the generated simulation image from the user through, for example, the touch-panel-equipped display. The correction includes at least one of translation, rotation, scaling, and deformation of the makeup image. Makeup correction unit 290 generates the correction information, and outputs the generated correction information to correction information recording unit 300 and reference point setting unit 240.

In the correction information, the region of the post-correction makeup image is indicated using the relative position to the facial feature points. The correction information includes reference point difference information. As used herein, the reference point difference information means information indicating how the facial reference points move from the default position. More specifically, the reference point difference information means information indicating a difference between the positions of the makeup reference points (the position of the facial reference points) in the region of the post-correction makeup image and the default position of the facial reference points using a face coordinate system. The face coordinate system and a makeup image correction technique are described in detail later.

Correction information recording unit 300 records the input correction information. More specifically, correction information recording unit 300 stores the correction information in a storage medium, the storage medium being able to be used by a user using a device other than makeup supporting device 100. For example, correction information recording unit 300 is connected to a communication network such as the Internet, and the correction information is transmitted to a shared server on the communication network, thereby performing the recording.

Although not illustrated, for example, makeup supporting device 100 includes a CPU, a storage medium such as a ROM in which the control program is stored, and a working memory such as a RAM. In this case, the CPU executes the control program to implement a function of each of the above units.

In makeup supporting device 100, the region of the makeup image of the corrected makeup created by a user can be recorded using the relative position to the facial feature points.

The facial feature points, the face coordinate system, contents of the makeup table, contents of the makeup information table, a simulation image generating technique, a makeup image correction technique, and the content of the correction information will sequentially be described in detail below.

<Facial Feature Points>

Figure 3:
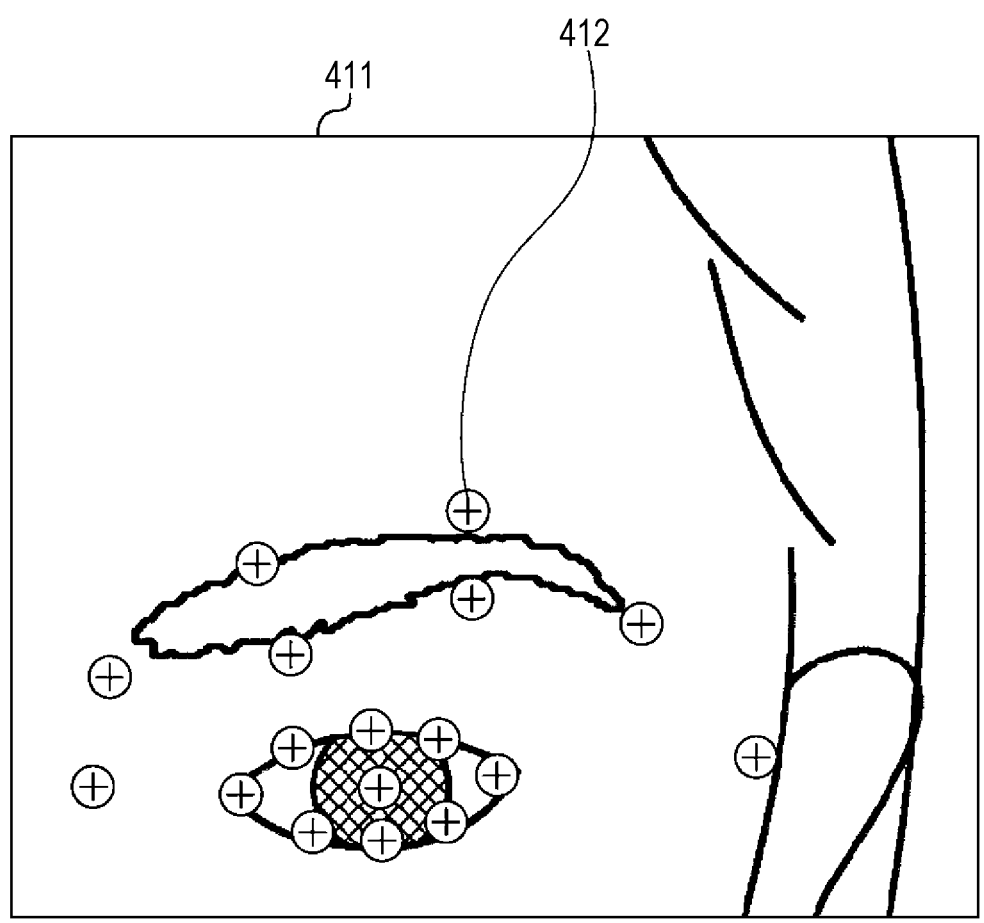
FIG. 3 is a view illustrating an example of facial feature points according to the second exemplary embodiment.

FIG. 3 is a view illustrating an example of the facial feature points.

As illustrated in FIG. 3, a plurality of facial feature points 412 (in FIG. 3, indicated by marks with a circle having a cross therein) are extracted from facial image (only a part is illustrated) 411 in each facial component, for example. Facial feature points 412 are mainly located in an edge, an acute portion, a central portion, and the like of the facial component. The arrangement of facial feature points 412 depends on the face.

<Face Coordinate System>

Figure 4:
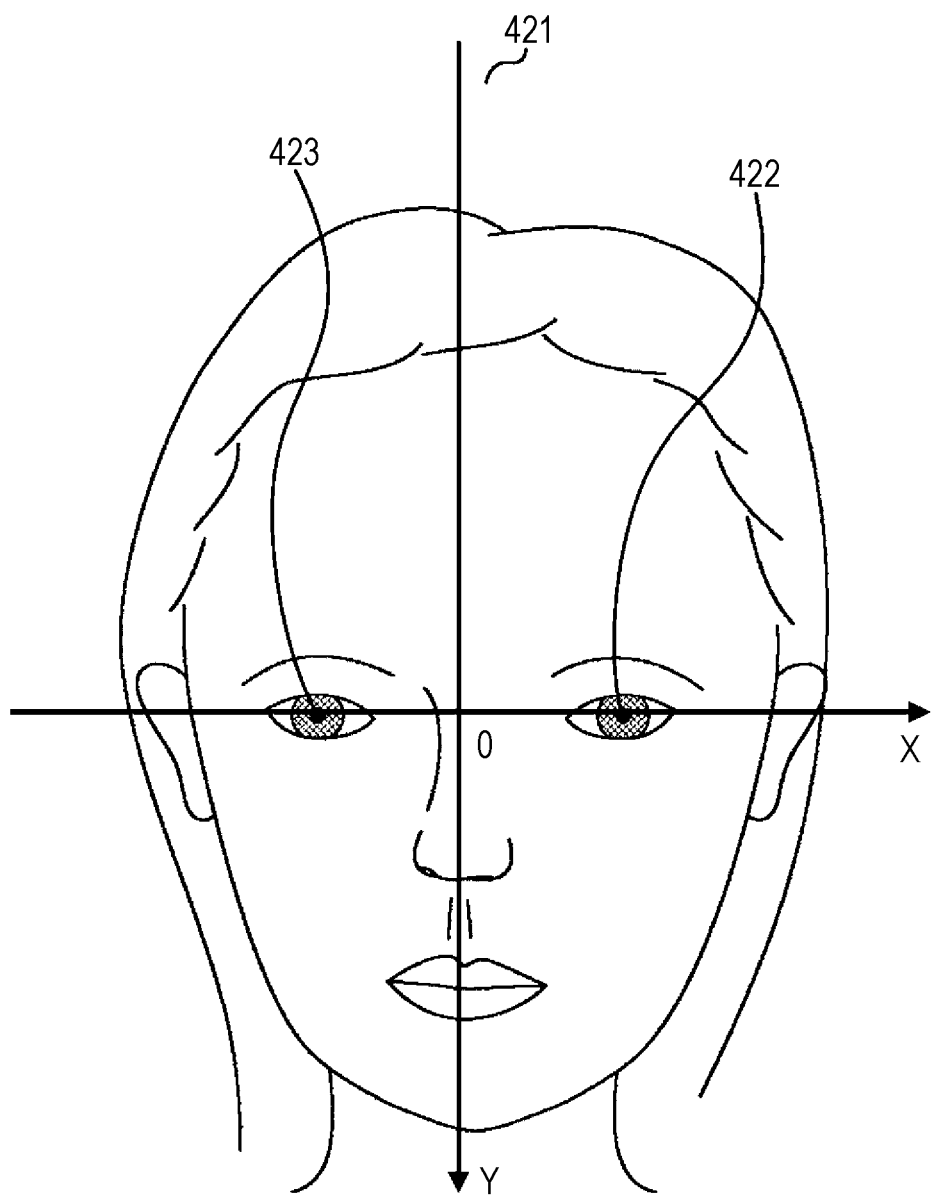
FIG. 4 is a view illustrating an example of a facial coordinate system according to the second exemplary embodiment.

FIG. 4 is a view illustrating an example of the face coordinate system.

As illustrated in FIG. 4, in facial coordinate system 421, an X-axis is set to an axis passing through center 422 of a left eye and center 423 of a right eye, and a Y-axis is set to an axis, which is orthogonal to the X-axis and passes through a center point between center 422 of the left eye and center 423 of the right eye. Note that, desirably a unit length of facial coordinate system is a length that is proportional to a distance between the plurality of facial feature points, such as a length based on a distance between center of the left eye and center of the right eye.

Note that, the facial coordinate system is not limited to the example illustrated in FIG. 4. For example, the facial coordinate system may be defined by an axis passing through a tip of a nose and the outer corner of the right eye and an axis passing through the tip of the nose and the outer corner of the left eye. These axes may individually be defined in each of makeup types such as cheek makeup, eye shadow, and eyebrow-paint.

<Content of Makeup Table>

FIG. 5 is a view illustrating an example of contents of a makeup table stored in makeup information storage 250.

As illustrated in FIG. 5, makeup pattern 431 and makeup ID 432 are stored in makeup table 430 in correlation with each other. Although simplified in FIG. 5, makeup pattern 431 specifically includes text information, such as "cute" and "cool", which expresses an impression associated with the makeup.

Makeup selector 260 receives the makeup selection manipulation from the user by displaying the text information such as "cute" and "cool" of makeup pattern 431 as an option.

<Contents of Makeup Information Table>

FIG. 6 is a view illustrating an example of contents of the makeup information table stored in makeup information storage 250.

As illustrated in FIG. 6, for example, makeup ID 441, makeup type 442, color 443, density 444, and area 445 are stored in makeup information table 440 in correlation with one another. Makeup ID 441, makeup type 442, color 443, density 444, and area 445 constitute the makeup information.

Makeup ID 441 corresponds to makeup ID 432 (see FIG. 5) of makeup table 430. Although simplified in FIG. 6, specifically makeup type includes "eyebrow-paint", "foundation", "eye shadow", "lipstick", "cheek makeup", and the like.

A set of color 443, density 444, and area 445 includes at least information necessary for visualization of the makeup state.

Although simplified in FIG. 6, specifically color 443 includes an RGB value, glossiness, and the like. Although simplified in FIG. 6, specifically density 444 includes permeability during the superimposition on the facial image, a gradation method, and the like. Although simplified in FIG. 6, specifically area 445 includes a relative range of application region to one or a plurality of makeup reference points.

Figure 7:
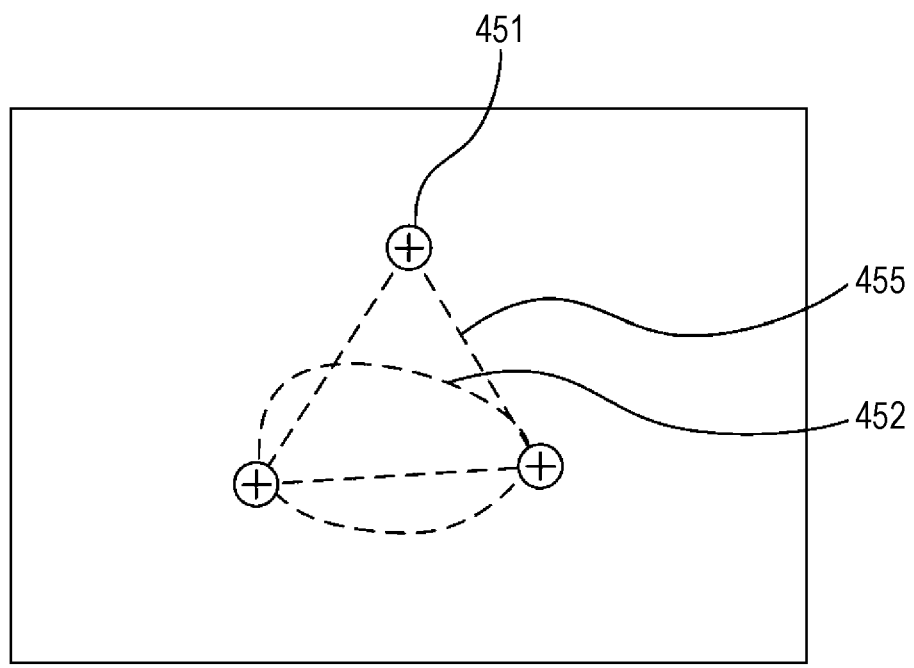
FIG. 7 is a view illustrating an example of a specific content of a makeup range according to the second exemplary embodiment.

FIG. 7 is a view illustrating an example of details of area 445 (see FIG. 6) of the eye shadow for the left eye.

As illustrated in FIG. 7, area 445 of the eye shadow for the left eye includes a combination of three makeup reference points 451 and application region 452 in which the relative position is set to makeup reference points 451. For example, the relative positional relationship is defined using a coordinate system based on makeup reference points 451.

A latest makeup changes quickly, and the makeup to be presented also changes quickly. Therefore, for example, desirably makeup table 430 and makeup information table 440 are periodically updated from a server on the Internet through a communication circuit (not illustrated) provided in makeup supporting device 100. Makeup table 430 illustrated in FIG. 5 and makeup information table 440 illustrated in FIG. 6 may be integrated into one table.

<Simulation Image Generating Technique>

Figure 8:
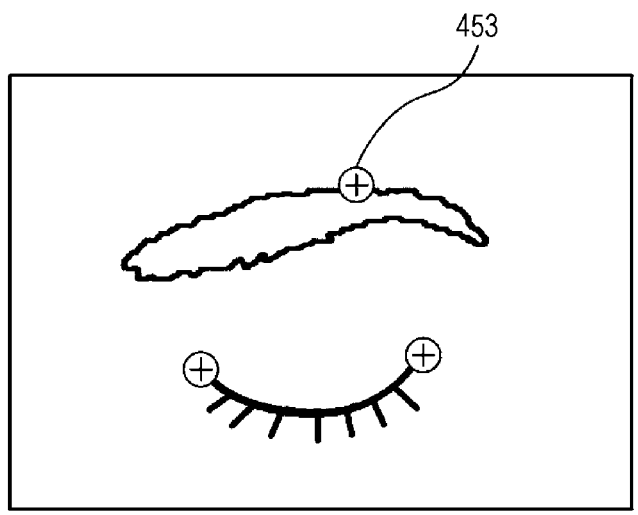
FIG. 8 is a view illustrating an example of a simulation image generating technique according to the second exemplary embodiment.
Figure 8:
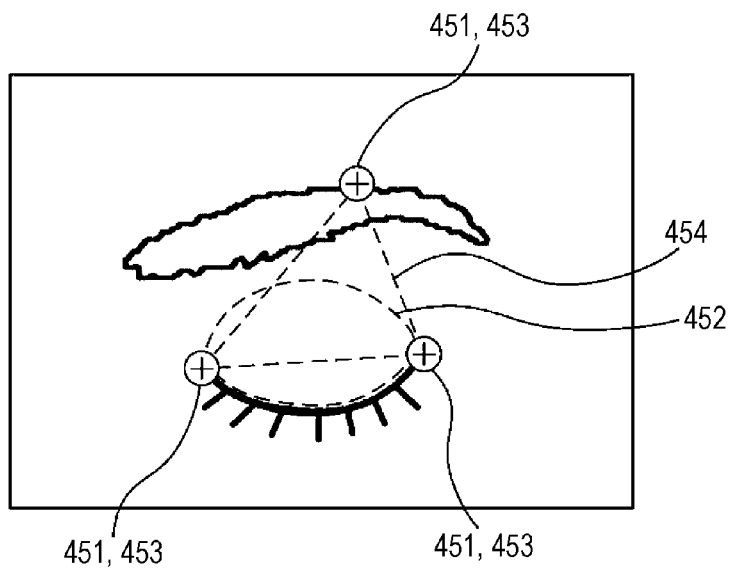

FIG. 8 is a view illustrating an example of a simulation image generating technique.

As illustrated in FIG. 8, it is assumed that three facial reference points 453 corresponding to the three makeup reference points 451 illustrated in FIG. 7 are set with respect to the facial image.

Makeup presentation unit 270 performs processing of adjusting three makeup reference points 451 to corresponding three facial reference points 453 while holding the relative position of application region 452 to three facial reference points 453 (hereinafter, such processing is referred to as "reference point adjusting processing").

A relative positional relationship (shape of triangle 454) among three facial reference points 453 is not necessarily matched with relative positional relationship (shape of triangle 455) among three makeup reference points 451. When resolution of the facial image is adjusted to resolution of the default makeup image indicated by the makeup information, a relative distance (size of triangle 454) among three facial reference points 453 is not necessarily matched with a relative distance (size of triangle 455) among three makeup reference points 451.

Therefore, in the case where these relative positional relationships or the relative distances vary, makeup presentation unit 270 performs the reference point adjusting processing by scaling or deforming application region 452 using a well-known image processing technology such as an affine transform.

Makeup presentation unit 270 generates the makeup image using application region 452 where the reference point adjusting processing is already performed. Makeup presentation unit 270 generates the simulation image by superimposing the makeup image of the selected makeup on the facial image using the application region where the reference point adjusting processing is already performed. For example, the makeup image is generated based on the facial component information and the makeup information.

For example, the image superimposition in the simulation image is performed by well-known image combination processing such as alpha ($\alpha$) blend processing. In this case, the $\alpha$ value is set to a value corresponding to the makeup density. For example, the alpha blend processing is expressed by the following equations (1) to (3). Where r1, g1, and b1 are RGB values in any region of the photographed image. Where, r2, g2, and b2 are RGB values in any region of the makeup image. Where, R, G, and B are RGB values in the corresponding region of the simulation image.

$$R = r2 \times \alpha + r1 \times (1-\alpha) \quad (1)$$

$$G = g2 \times \alpha + g1 \times (1-\alpha) \quad (2)$$

$$B = b2 \times \alpha + b1 \times (1-\alpha) \quad (3)$$

Moreover, it is assumed that order in a case where makeup is applied to the face several times (hereinafter, such order is referred to as "application order") is set to each makeup, and that the makeup image is a hatching image having density corresponding to the makeup density. For example, the application order defines that cheek application should be performed after foundation application. In this case, makeup presentation unit 270 may perform superimposition of the image in such a manner that the makeup images are overlaid on the facial image in which the eyebrows are erased, according to the application order.

Herein, in the case where the makeup simulation including the eyebrow-paint is performed, desirably makeup presentation unit 270 generates the simulation image using the image in which the eyebrow is erased from the photographed image. A well-known image processing technology such as a technology of PTL 4 can be used as the technology of erasing the eyebrow from the photographed image.

<Makeup Image Correction Technique>

First, makeup correction unit 290 selects the correction target makeup from pieces of makeup displayed in the simulation image. Then, makeup correction unit 290 selects a correction type to be performed from correction types including the translation, the rotation, the scaling, and the deformation. Further, makeup correction unit 290 fixes a level of the correction with respect to the selected correction type. Note that, the order of the correction type to be corrected may previously be fixed, or arbitrarily be selected by the user.

Makeup correction unit 290 receives the selection of the makeup, the selection of the correction type, and the fixing of the correction level from the user through the touch panel display. Specifically, makeup correction unit 290 first displays an option of the makeup and an option of the correction type. When the makeup and the correction type are selected, makeup correction unit 290 receives a drag manipulation with respect to the facial reference points. Herein, desirably makeup correction unit 290 displays the position of the facial reference points on the simulation image using a marker. When a predetermined manipulation indicating completion of the correction is performed, makeup correction unit 290 then generates correction information indicating a difference from an initial state of the facial reference points.

Figure 9:
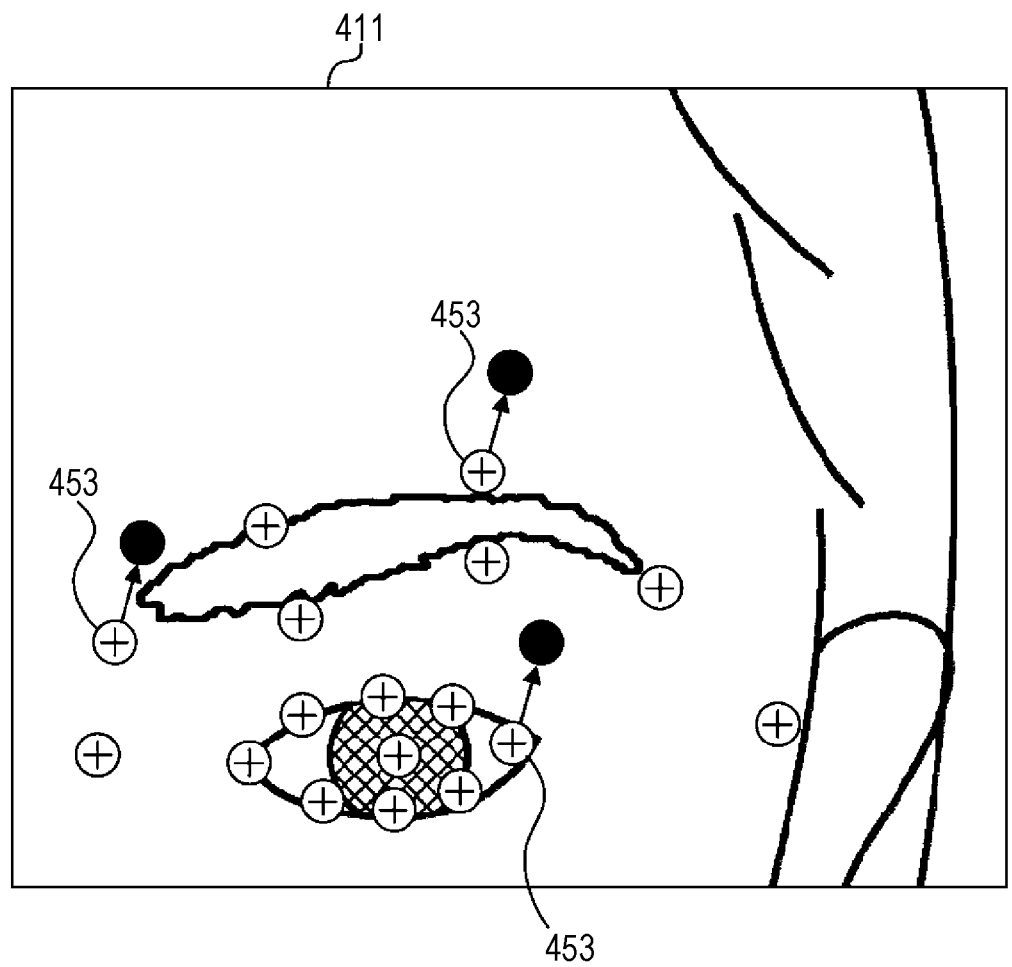
FIG. 9 is a view illustrating an example of a movement state of a facial reference points during translation according to the second exemplary embodiment.

FIG. 9 is a view illustrating the movement state of the facial reference points during the translation.

It is assumed that the translation is selected to perform the drag manipulation on one of the plurality of facial reference points 453. In this case, makeup correction unit 290 acquires a moving direction and a moving amount of facial reference point 453 on which the drag manipulation is performed. As illustrated in FIG. 9, makeup correction unit 290 then moves all other facial reference points 453 of the correction target makeup with the moving direction and moving amount that are identical to facial reference point 453 on which the drag manipulation is performed.

For example, the resolution of the translation is one hundredth of the distance between the center of the right eye and the center of the left eye. For example, the maximum moving amount from the initial state is the distance between the center of the right eye and the center of the left eye.

For example, the translation is expressed by differences $\Delta X$ and $\Delta Y$ between post-translation facial reference point 453 and the initial position in the face coordinate system.

Figure 10:
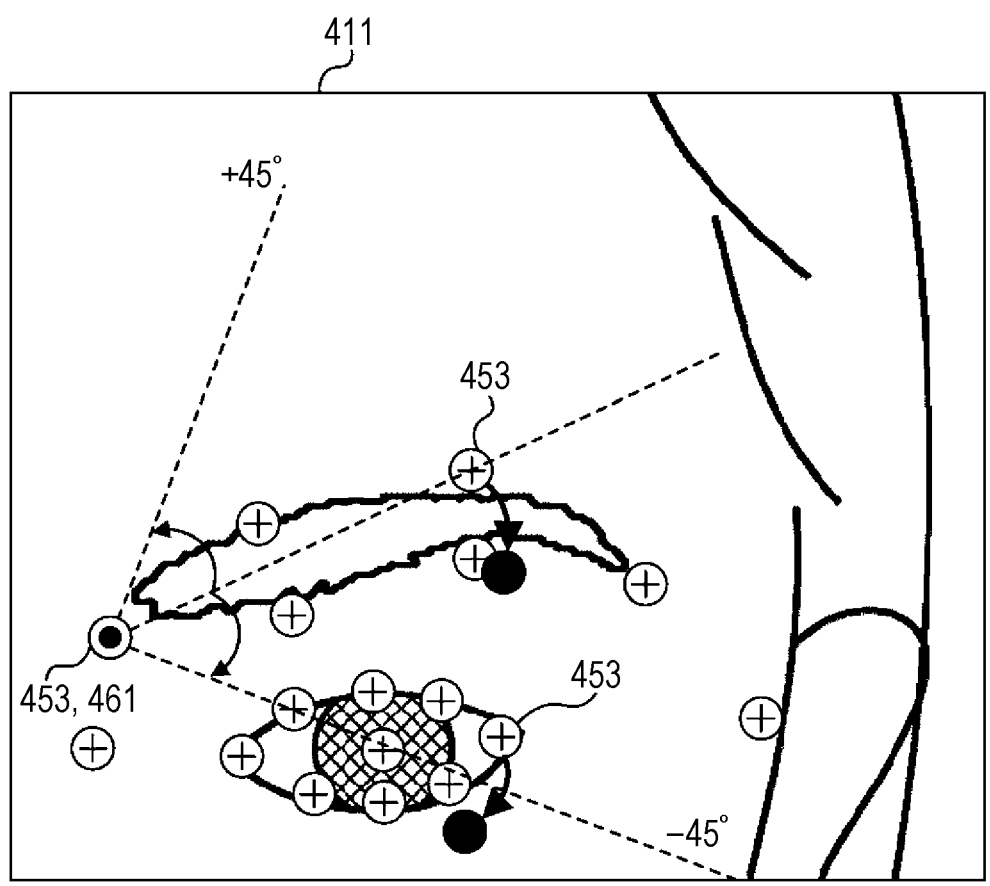
FIG. 10 is a view illustrating an example of a movement state of the facial reference points during rotation according to the second exemplary embodiment.

FIG. 10 is a view illustrating an example of a movement state of the facial reference points during the rotation.

It is assumed that the rotation is selected to perform the drag manipulation on one of the plurality of facial reference points 453. In this case, makeup correction unit 290 acquires a rotation direction and a rotation angle of facial reference point 453 on which the drag manipulation is performed, with respect to predetermined correction datum point 461. As illustrated in FIG. 10, makeup correction unit 290 then rotates all other facial reference points 453 of the correction target makeup with the identical rotation direction and the identical rotation angle, with respect to correction datum point 461.

For example, the resolution of the rotation is 0.01 degree. The maximum rotation angle from the initial state is ±45 degrees.

For example, the rotation is expressed by a counterclockwise rotation angle $\theta$ between post-translation facial reference point 453 and the initial position.

Figure 11:
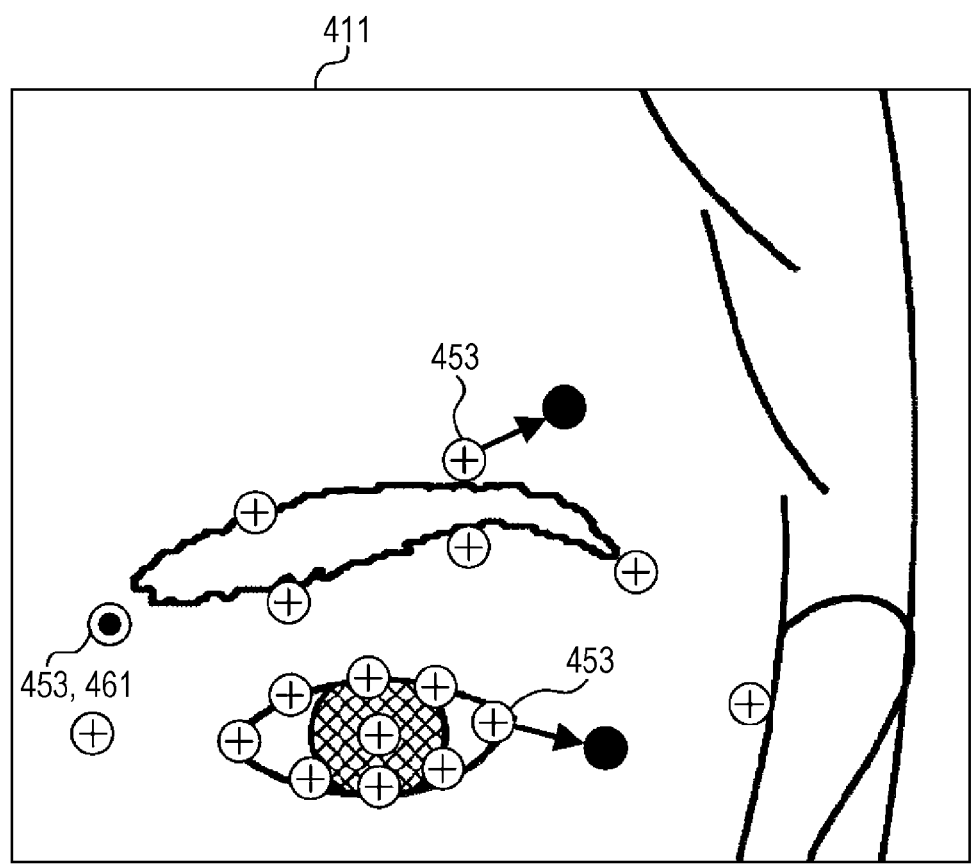
FIG. 11 is a view illustrating an example of a movement state of the facial reference points during scaling according to the second exemplary embodiment.

FIG. 11 is a view illustrating an example of a movement state of the facial reference points during the scaling.

It is assumed that the scaling is selected to perform the drag manipulation on one of the plurality of facial reference points 453. In this case, makeup correction unit 290 acquires an X-axis-direction distance and a Y-axis-direction distance between facial reference point 453 on which the drag manipulation is performed and predetermined correction datum point 461. Makeup correction unit 290 then acquires a scaling factor RX of the X-axis-direction distance from correction datum point 461 with respect to the initial state and a scaling factor RY of the Y-axis-direction distance from correction datum point 461 with respect to the initial state. As illustrated in FIG. 11, makeup correction unit 290 changes the distances between all other facial reference points 453 of the correction target makeup and correction datum point 461 with the identical scaling factor.

For example, the resolution of the scaling is 1%. The scaling ranges from 50% to 200%.

Figure 12:
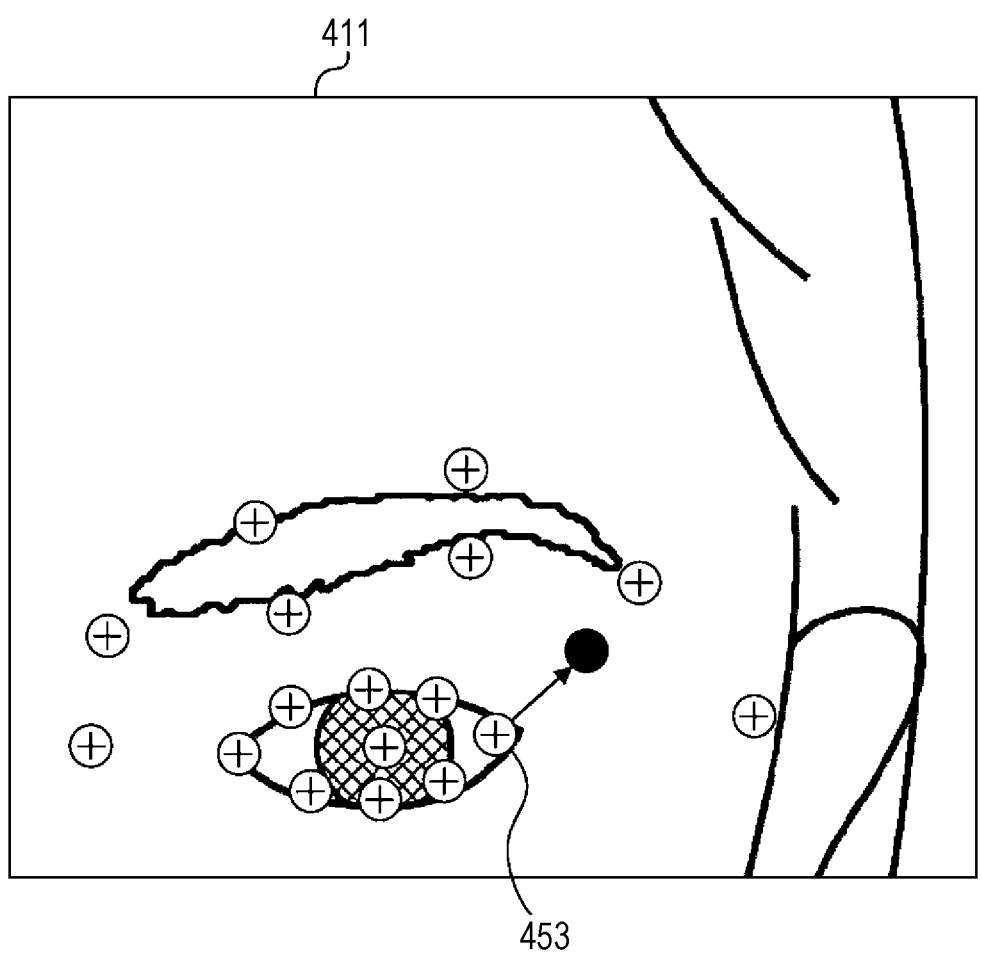
FIG. 12 is a view illustrating an example of a movement state of the facial reference point during deformation according to the second exemplary embodiment.

FIG. 12 is a view illustrating an example of a movement state of the facial reference point during the deformation.

It is assumed that the deformation is selected to perform the drag manipulation on one of the plurality of facial reference points 453. In this case, makeup correction unit 290 does not move other facial reference points 453 of the correction target makeup, but acquires the moving direction and the moving amount of facial reference point 453 on which the drag manipulation is performed.

For example, the deformation is expressed by identification information on facial reference point 453 on which the drag manipulation is performed and the differences ΔX and ΔY between facial reference point 453 and the initial position in the face coordinate system.

For example, correction datum point 461 necessary for the rotation and the scaling is the facial reference point of the inner end of the eyebrow in the case of the eyebrow-paint and nose shadow. Correction datum point 461 is the facial reference point in the center of iris of the eye in the case of eye shadow for the upper eyelid, eye shadow for the lower eyelid, mascara for the upper eyelashes, and mascara for lower eyelashes.

However, correction datum point 461 is not necessarily matched with the position of facial reference point 453. For example, correction datum point 461 may be set to a center position of the face or a barycentric position of the facial reference point in each makeup. The correction datum point may vary in each correction type. In addition, correction datum point 461 may arbitrarily set by the user.

As to bilaterally symmetric makeup such as the eyebrow-paint, makeup correction unit 290 may individually receive the correction of the right makeup and left makeup, or reflect the correction performed on one of pieces of the makeup into the other makeup (that is, laterally works together).

For example, the correction information generated through above correction includes the moving amount (ΔX) in the X-axis direction, the moving amount (ΔY) in the Y-axis direction, the rotation amount (θ), the scaling factor (RX) in the X-axis direction, and the scaling factor (RY) in the Y-axis direction, with respect to each reference point.

<Operation of Makeup Supporting Device>

Operation of makeup supporting device 100 will be described below.

Figure 13:
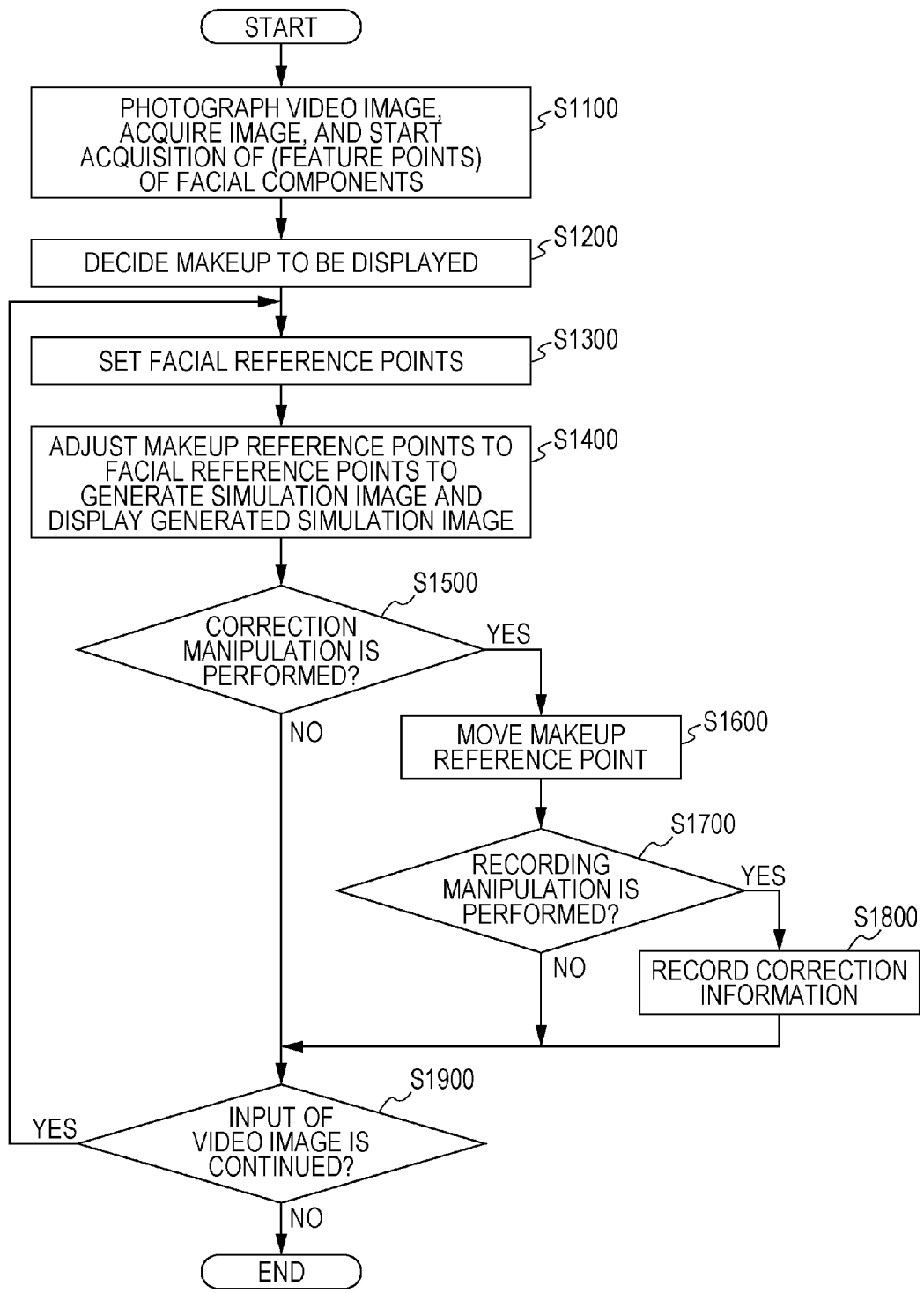
FIG. 13 is a flowchart illustrating an example of operation in the makeup supporting device of the second exemplary embodiment.

FIG. 13 is a flowchart illustrating an example of the operation of makeup supporting device 100.

In step S1100, photographing unit 210 starts the photographing of the video image of the user's face, and image acquisition unit 220 starts the acquisition of the photographed image constituting the photographed video image. Feature point acquisition unit 230 starts the acquisition of the facial components of the face included in the photographed image.

At this point, for example, feature point acquisition unit 230 analyzes the photographed image to extract the feature points of the face (or facial component) from the photographed image. Feature point acquisition unit 230 generates the facial feature point information from the acquired facial feature points.

Figure 14:
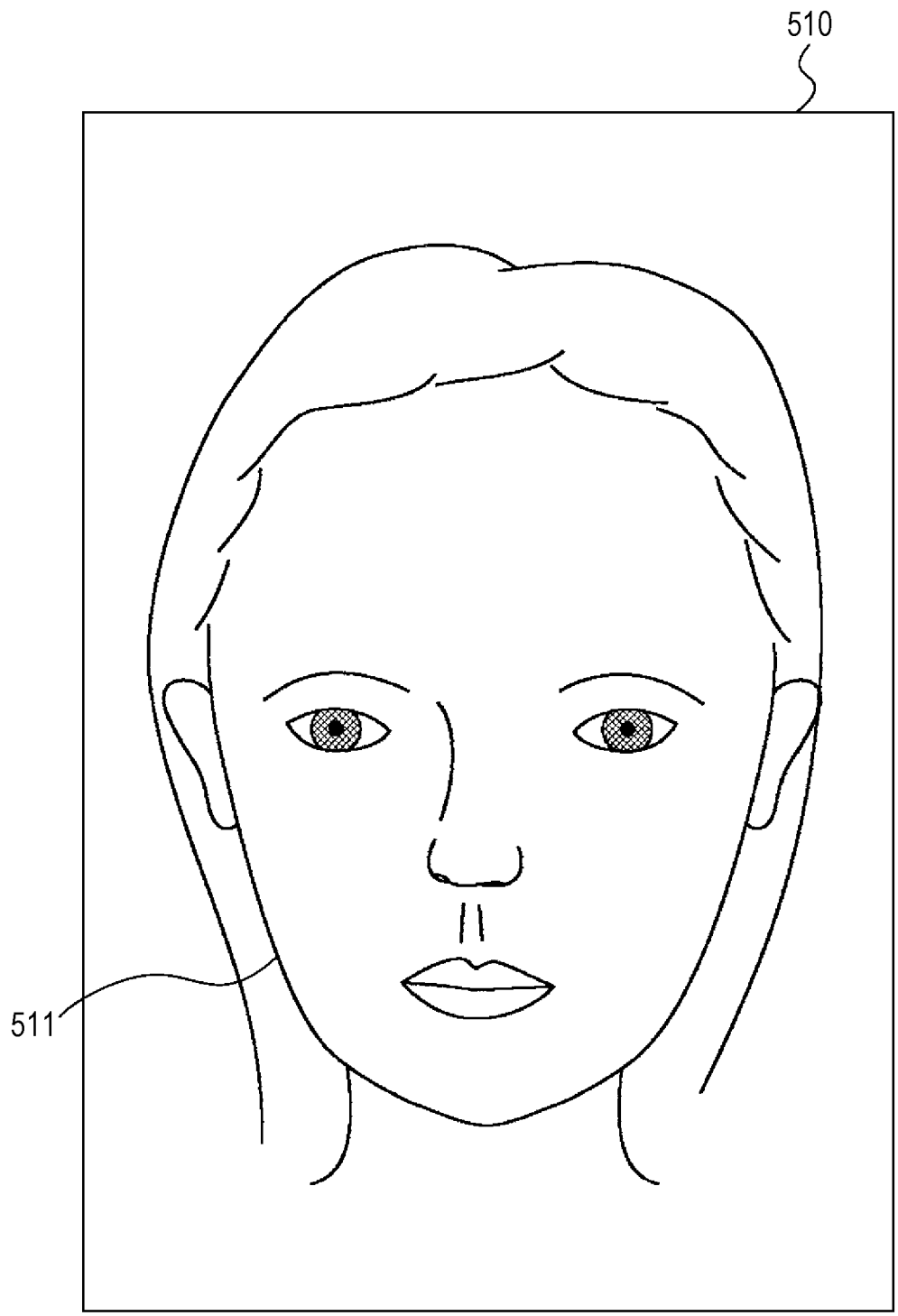
FIG. 14 is a view illustrating an example of a photographed image acquired according to the second exemplary embodiment.

FIG. 14 is a view illustrating an example of the photographed image acquired in step S1100 of FIG. 13.

As illustrated in FIG. 14, photographed image 510 includes facial image 511 of the user. At this point, the user does not apply the makeup. For example, the facial feature points as illustrated in FIG. 3 are extracted from photographed image 510 to generate the facial feature point information.

FIG. 15 is a view illustrating an example of the facial feature point information generated in step S1100 of FIG. 13.

As illustrated in FIG. 15, in facial feature point information 520, for example, facial feature point position 523 and person ID 524 are described in each combination of facial component ID 521 and facial feature point ID 522.

Facial component ID 521 is identification information on each of facial components such as a left eye and an upper lip. Facial feature point ID 522 is the identification information on each of the facial feature points such as the facial feature point of the inner end of the eyebrow and the facial feature point of the center of the eye. Facial feature point position 523 is the position of the facial feature point. For example, facial feature point position 523 is expressed by a coordinate value of the face coordinate system. Person ID 524 is identification information on a person. For example, each time the photographing is started, and a value designated by the user is set to person ID 524 through the manipulation performed on the touch-panel-equipped display.

Then, in step S1200 of FIG. 13, makeup selector 260 selects the makeup, and outputs makeup information to makeup presentation unit 270.

Then, in step S1300 of FIG. 13, reference point setting unit 240 sets the facial reference points based on the facial feature point information and a predetermined rule. That is, reference point setting unit 240 sets the positions of the facial feature points as the initial positions of the facial reference points. Then, reference point setting unit 240 generates the facial reference point information, and outputs the generated facial reference point information to makeup presentation unit 270.

FIG. 16 is a view illustrating an example of the facial reference point information generated in step S1300 of FIG. 13.

As illustrated in FIG. 16, in facial reference point information 530, facial reference point position 533, correction datum position 534, and person ID 535 are described in each combination of facial component ID 531 and facial reference point ID 532.

Facial component ID 531 and person ID 535 correspond to facial component ID 521 and person ID 524 of facial feature point information 520, respectively. Facial reference point position 533 is the position of the facial reference point. For example, facial reference point position 533 is expressed by the coordinate value of the face coordinate system. Correction datum position 534 is the position of the correction datum point. For example, correction datum position 534 is expressed by the coordinate value of the face coordinate system.

Then, in step S1400 of FIG. 13, makeup presentation unit 270 fixes the application region of the makeup image to the facial image such that the positions of the makeup reference points are adjusted to the positions of the facial reference points indicated by the facial reference point information. The simulation image is generated in the fixed application region by superimposing the makeup image on the facial image. Display unit 280 displays the generated simulation image.

Figure 17:
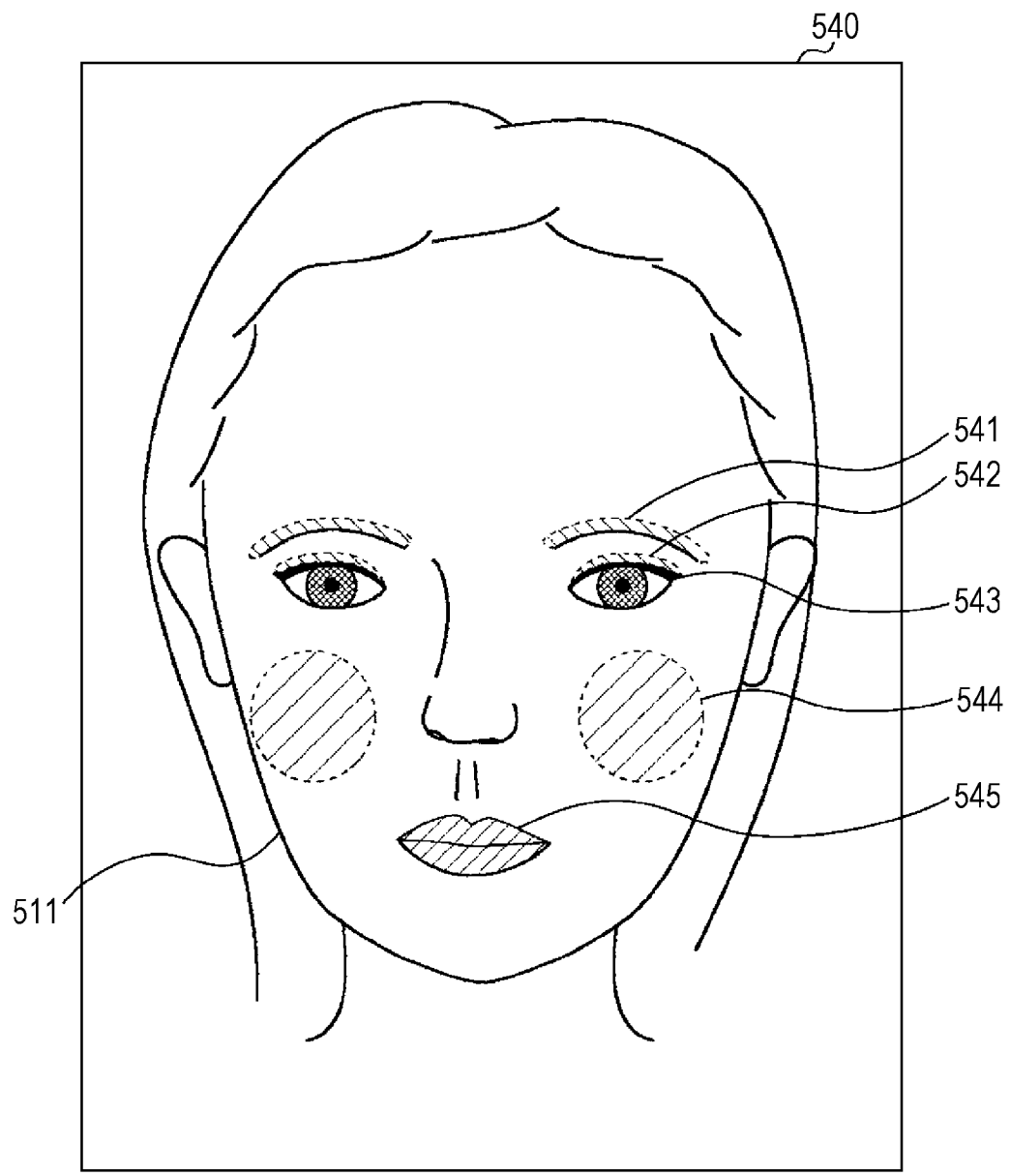
FIG. 17 is a view illustrating an example of a simulation image generated according to the second exemplary embodiment.

FIG. 17 is a view illustrating an example of the simulation image generated in step S1400 of FIG. 13.

As illustrated in FIG. 17, simulation image 540 is the image in which makeup images 541 to 545, such as the eyebrow-paint, eye shadow, eyeliner, cheek makeup, and lipstick images, are superimposed on facial image 511.

Then, in step S1500 of FIG. 13, makeup correction unit 290 determines whether or not the correction manipulation is performed on the makeup image. Specifically, for example, the correction manipulation is the drag manipulation performed on the facial reference points. If the correction manipulation is performed on the makeup image (YES in S1500), makeup correction unit 290 moves the processing to step S1600. If the correction manipulation is not performed on the makeup image (NO in S1500), makeup correction unit 290 moves the processing to step S1900 (to be described later).

In step S1600, makeup correction unit 290 outputs the correction information indicating the details of the correction manipulation to reference point setting unit 240. According to the correction information, reference point setting unit 240 moves the positions of the makeup reference points to generate a post-correction simulation image.

Figure 18:
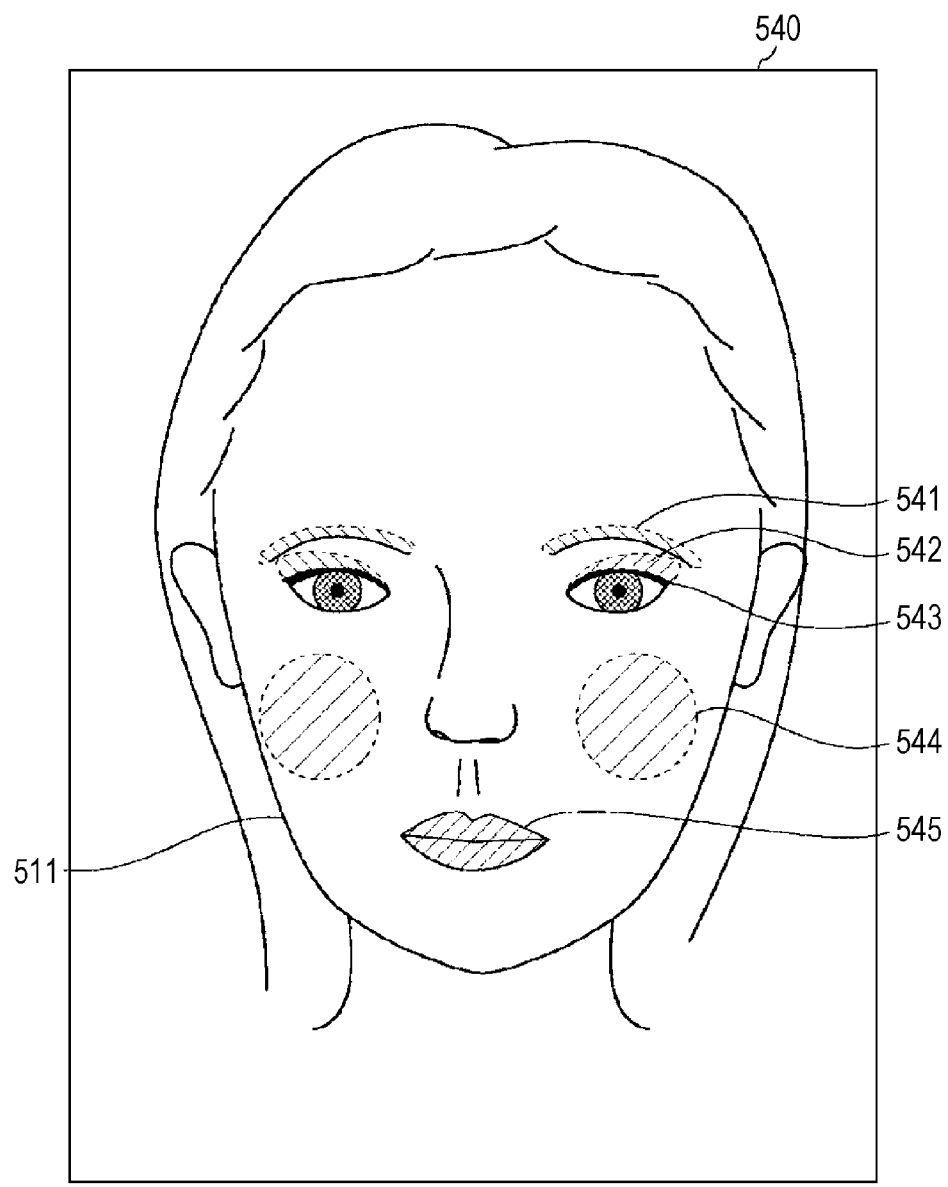
FIG. 18 is a view illustrating an example of a corrected simulation image generated according to the second exemplary embodiment.

FIG. 18 is a view illustrating an example of the corrected simulation image generated in step S16 of FIG. 13.

As illustrated in FIG. 18, for example, the facial reference points are dragged such that the application region of eye shadow 542 is expanded upwardly outward.

Then, in step S1700 of FIG. 13, makeup correction unit 290 determines whether or not a manipulation to record the correction content (hereinafter, referred to as a "recording manipulation") is performed. For example, the recording manipulation is a manipulation to click a predetermined icon. If the recording manipulation is not performed (NO in S1700), makeup correction unit 290 moves the processing to step S1900. If the recording manipulation is performed (YES in S1700), makeup correction unit 290 moves the processing to step S1800.

In step S1800, makeup correction unit 290 stores (records) the correction information indicating the correction content at that time in the storage medium that can be used by a user of a device other than makeup supporting device 100.

FIG. 19 is a view illustrating an example of the correction information recorded in step S1800 of FIG. 13.

As illustrated in FIG. 19, in correction information 550, positional difference 553 and person ID 554 are described in each combination of facial component ID 551 and facial reference point ID 552.

Facial component ID 551, facial reference point ID 552, and person ID 554 correspond to facial component ID 531, facial reference point ID 532, and person ID 535 of facial reference point information 530, respectively. For example, positional difference 553 is the moving amount ($\Delta X$) in the X-axis direction, the moving amount ($\Delta Y$) in the Y-axis direction, the rotation amount ($\theta$), the scaling factor (RX) in the X-axis direction, and the scaling factor (RY) in the Y-axis direction.

Then, in step S1900 of FIG. 13, image acquisition unit 220 determines whether or not the input of the video image is continued. If the input of the video image is continued (YES in S1900), image acquisition unit 220 returns the processing to step S1300 to switch the processing to the next photographed image. If the input of the video image is ended (NO in S1900), image acquisition unit 220 ends a sequence of pieces of processing.

The correction information on the corrected makeup created by a user is recorded through the above processing. As described above, the correction information is the information in which the correction content of the makeup image is described using the relative position to the facial feature points. Accordingly, for example, the simulation image can be generated in another device by combining the makeup image, to which the correction content indicated by the correction information is applied, with a facial image of another user.

In this case, for example, a procedure in which another device generates the simulation image is identical to the procedure in which makeup supporting device 100 generates the simulation image. It is necessary for another device (another makeup supporting device) to include a correction acquisition unit that acquires the correction information recorded by makeup supporting device 100. It is also necessary for another device to include a makeup presentation unit that generates another simulation image. Based on the acquired correction information, another simulation image is obtained by superimposing the post-correction makeup image on an image obtained by photographing another face.

The makeup to which the correction information is applied may be the makeup identical to the correction target makeup, or a makeup different from the correction target makeup. For example, the correction information may be applied to the makeup having a color different from that of the correction target makeup.

Figure 20:
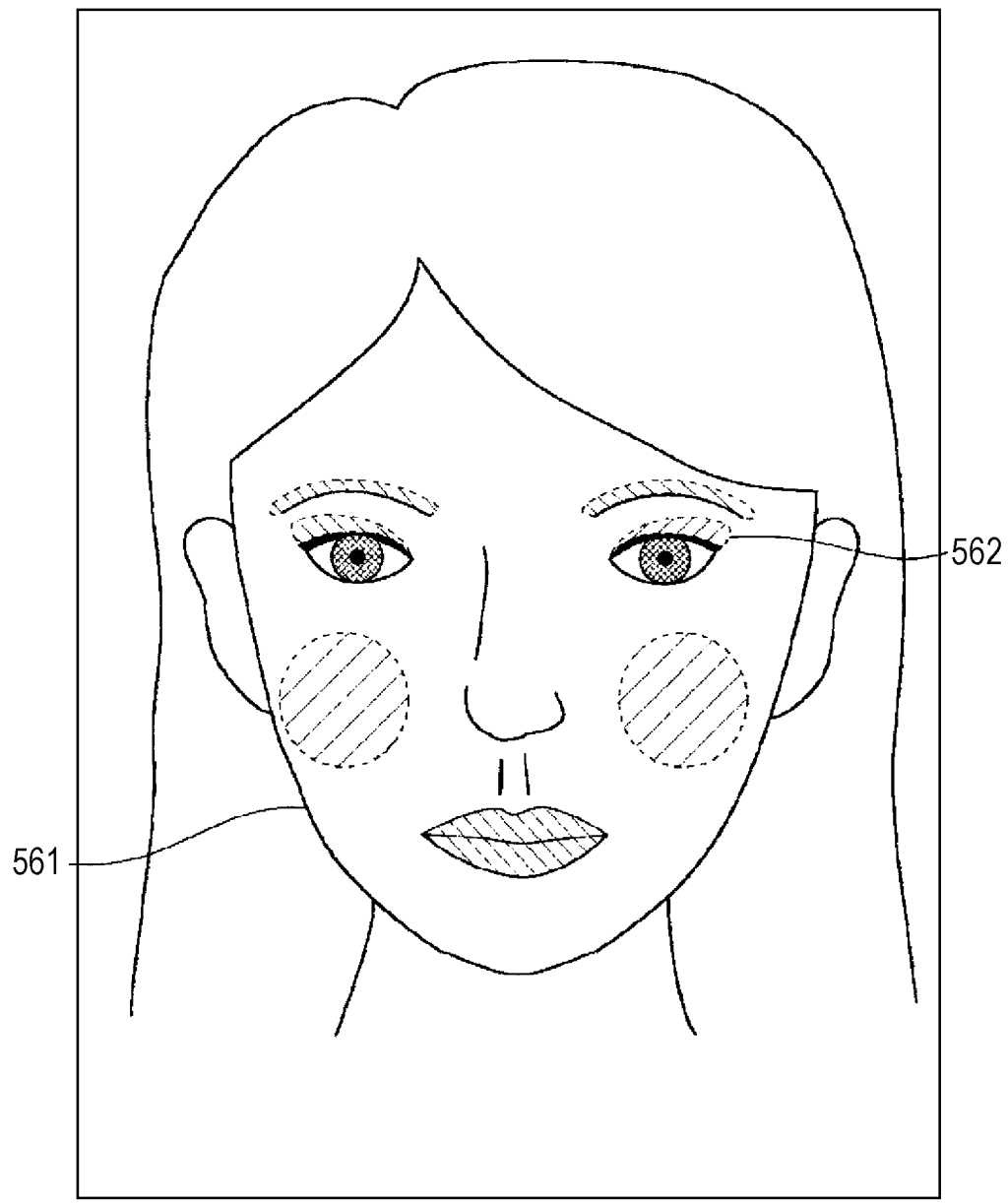
FIG. 20 is a view illustrating an example of a simulation image of another user's face according to the second exemplary embodiment.

FIG. 20 illustrates an example of the simulation image when the recorded correction information is applied to a face of another user.

As illustrated in FIG. 20, the corrected makeup can also be applied to facial image 561 of the face different from that of the simulation image in which the corrected makeup is created. That is, eye shadow 562 is suitable for facial image 561, and the application region is expanded upwardly outward like the original corrected makeup.

As described above, in makeup supporting device 100 of the second exemplary embodiment, the region of the makeup image of the corrected makeup created by a user can be recorded using the relative position to the facial feature points. Usually, the facial feature point includes information that can be acquired from the face irrespective of an individual difference of a size, a shape, and an arrangement of a facial component. Accordingly, makeup supporting device 100 can simply apply the corrected makeup created by a user to another user.

Makeup supporting device 100 may constitute a makeup supporting system. The makeup supporting system includes the plurality of makeup supporting devices 100, and the correction information is shared among the plurality of makeup supporting devices 100.

In this case, desirably the makeup supporting system includes a server arranged on the communication network, and the correction information generated by each makeup supporting device 100 is collected and accumulated in the server.

In this case, the server may analyze a trend of the makeup from the collected pieces of correction information, and propose the corrected makeup to the user of each makeup supporting device 100 based on an analysis result. Based on the analysis result, the server may generate the makeup information, and distribute the makeup information to each makeup supporting device 100.

<Other Modes of Correction Information>

The mode of the correction information is not limited to the above example. For example, the correction information may be one that indicates a difference between the positions of the default makeup reference points and the positions of the makeup reference points after the makeup reference points are moved.

<Other Makeup Selecting Techniques>

The makeup selecting technique is not limited to the above example. For example, makeup selector 260 may automatically select the makeup suitable for the feature of the face or the latest makeup.

<Modifications of Other Configurations>

The various tables may not necessarily be stored in makeup supporting device 100. For example, in the case where makeup supporting device 100 can be connected to a network, makeup supporting device 100 may select the makeup by accessing a server, in which the table is stored, on the network.

For example, makeup supporting device 100 may be such a distributed arrangement system that only photographing unit 210 and display unit 280 in the functional units illustrated in FIG. 2 may be provided in a terminal carried by the user, and other functional units are provided in a server on the network.

Moreover, makeup supporting device 100 may detect natural light, and acquire the facial feature points while an influence of the natural light is reduced from the image.

Makeup supporting device 100 may present information on cosmetics necessary for the makeup to the user together with the simulation image.

A makeup supporting device of the present disclosure includes: a makeup presentation unit that generates a simulation image by superimposing a makeup image on an image obtained by photographing a face, the makeup image indicating a state in which makeup is applied to the face; a makeup correction unit that receives correction of the makeup image included in the generated simulation image from a user; and a correction information recording unit that records correction information which indicates a region of a post-correction makeup image using a relative position to facial feature points.

The makeup supporting device may further include: an image acquisition unit that acquires the image; a feature point acquisition unit that acquires the facial feature points from the acquired image; and a display unit that displays the generated simulation image.

In the makeup supporting device, the correction information recording unit may store the correction information in a recording medium that is useable by a user of a device other than the makeup supporting device.

The makeup supporting device may further include a makeup information storage in which makeup information is stored, the makeup information indicating a region of a pre-correction makeup image using the relative position to the facial feature points. At this point, the correction information may include information indicating the region of the pre-correction makeup image and information indicating a difference between the region of the post-correction makeup image and the region of the pre-correction makeup image.

In the makeup supporting device, the correction may include at least one of translation, rotation, scaling, and deformation of the makeup image, the makeup information may include information indicating the relative position of the region of the pre-correction makeup image to the facial feature points, and the correction information may include information that indicates the difference between the region of the post-correction makeup image and the region of the pre-correction makeup image using a face coordinate system based on an arrangement of the facial feature points.

The makeup supporting device may further include a reference point setting unit that sets facial reference points to the image based on the acquired facial feature points. At this point, the makeup information may include information indicating positions of the makeup reference points set with respect to the region of the makeup image, the makeup reference points becoming target points which are adjusted to facial reference points set in the image, the makeup presentation unit may fix the region of the makeup image with respect to the image by adjusting the position of the makeup reference points in the makeup image to the position of the set facial reference points, and the correction information may include the information indicating a difference between the positions of the makeup reference points in the region of the post-correction makeup image and default positions of the facial reference points using the face coordinate system.

The makeup supporting device may further include a photographing unit that photographs a video image of the face. At this point, the image acquisition unit may acquire an image constituting the video image, the display unit may sequentially display the simulation image along the video image, and the reference point setting unit may set the positions of the facial reference points according to the correction information after the correction is set.

A makeup supporting system of the present disclosure includes: a first makeup supporting device; and a second makeup supporting device. At this point, the first makeup supporting device includes: a first makeup presentation unit that generates a first simulation image by superimposing a makeup image on a first image obtained by photographing a first face, the makeup image indicating a state in which makeup is applied to the first face; a makeup correction unit that receives correction of the makeup image included in the generated first simulation image from a user; and a correction information recording unit that records correction information which indicates a region of a post-correction makeup image using a relative position to facial feature points, and the second makeup supporting device includes: a correction acquisition unit that acquires the recorded correction information; and a second makeup presentation unit that generates a second simulation image by superimposing the post-correction makeup image on a second image obtained by photographing a second face, based on the acquired correction information.

A makeup supporting method of the present disclosure includes: generating a simulation image by superimposing a makeup image on an image obtained by photographing a face, the makeup image indicating a state in which makeup is applied to the face; receiving correction of the makeup image included in the generated simulation image from a user; and recording correction information which indicates a region of a post-correction makeup image using a relative position to facial feature points.

A non-transitory computer-readable recording medium of the present disclosure stores a program for causing a device including a processor to perform pieces of processing of: generating a simulation image by superimposing a makeup image on an image obtained by photographing a face, the makeup image indicating a state in which makeup is applied to the face; receiving correction of the makeup image included in the generated simulation image from a user; and recording correction information which indicates a region of a post-correction makeup image using a relative position to facial feature points.

The present disclosure is usefully applied to a makeup supporting device, a makeup supporting system, a makeup supporting method, and a makeup supporting program for being able to simply apply corrected makeup created by a user to another user.

What is claimed is:

1. A makeup supporting device comprising:
a makeup information storage that stores makeup information including a first makeup information item including color information and area information indicating a first area defined by first makeup reference points; and
a processor that, when executing instructions stored in a storage, performs operations comprising:
acquiring facial feature points including first facial feature points from an image obtained by photographing a face;
setting facial reference points to the image based on the facial feature points, the facial reference points including first facial reference points which are set to the image based on the acquired first facial feature points;
generating a simulation image by superimposing a makeup image on the image, the makeup image indicating a state in which makeup is applied to the face;
receiving correction of the makeup image included in the generated simulation image from a user; and
recording correction information which indicates a region of a post-correction makeup image using a relative position to the facial feature points,
wherein the generating comprises:
generating a second area defined by the first facial reference points, such that the second area and the first area have a same relationship as a relationship between the first facial reference points and the first makeup reference points; and
painting the second area with a color indicated by the color information stored in the makeup information storage, to generate the simulation image,
wherein, in the receiving of correction, the user changes an outline of the second area to generate a third area, the third area having the changed outline and having the color, and
wherein the correction information includes information defining the difference between the second area and the third area.

2. The makeup supporting device according to claim 1, further comprising:
a display that displays the generated simulation image.

3. The makeup supporting device according to claim 2, wherein the correction information is stored in a recording medium that is useable by a user of a device other than the makeup supporting device.

4. The makeup supporting device according to claim 3, wherein the makeup information indicating a region of a pre-correction makeup image using the relative position to the facial feature points, and
wherein the correction information includes information indicating the region of the pre-correction makeup image and information indicating a difference between the region of the post-correction makeup image and the region of the pre-correction makeup image.

5. The makeup supporting device according to claim 4, wherein the correction includes at least one of translation, rotation, scaling, and deformation of the makeup image,
the makeup information includes information indicating the relative position of the region of the pre-correction makeup image to the facial feature points, and
the correction information includes information that indicates the difference between the region of the post-correction makeup image and the region of the pre-correction makeup image using a face coordinate system based on an arrangement of the facial feature points.

6. The makeup supporting device according to claim 5,
wherein the makeup information includes information indicating positions of makeup reference points set with respect to the region of the makeup image, the makeup reference points becoming target points which are adjusted to facial reference points set in the image,
the region of the makeup image is determined with respect to the image by adjusting the position of the makeup reference points in the makeup image to the position of the set facial reference points, and
the correction information includes information indicating a difference between the positions of the makeup reference points in the region of the post-correction makeup image and default positions of the facial reference points using the face coordinate system.

7. The makeup supporting device according to claim 6, further comprising:
a camera that photographs a video image of the face,
wherein the image comprises the video image,
the display sequentially displays the simulation image along the video image, and
the positions of the facial reference points are set according to the correction information after the correction is set.

8. A makeup supporting system comprising:
a first makeup supporting device; and
a second makeup supporting device,
wherein the first makeup supporting device includes:
a makeup information storage that stores makeup information including a first makeup information item including color information and area information indicating a first area defined by first makeup reference points; and
a processor that, when executing instructions stored in a storage, performs operations comprising:
acquiring facial feature points including first facial feature points from a first image obtained by photographing a first face;
setting first facial reference points to the first image based on the acquired first facial feature points;
generating a first simulation image by superimposing a makeup image on the first image, the makeup image indicating a state in which makeup is applied to the first face;
receiving correction of the makeup image included in the generated first simulation image from a user; and
recording correction information which indicates a region of a post-correction makeup image using a relative position to the first facial feature points,
wherein the generating comprises:
generating a second area defined by the first facial reference points, such that the second area and the first area have a same relationship as a relationship between the first facial reference points and the first makeup reference points; and painting the second area with a color indicated by the color information stored in the makeup information storage, to generate the simulation image, wherein, in the receiving of correction, the user changes an outline of the second area to generate a third area, the third area having the changed outline and having the color, and wherein the correction information includes information defining the difference between the second area and the third area, and wherein the second makeup supporting device includes a processor that, when executing instruction stored in a storage, performs operations comprising:
acquiring the recorded correction information; and
generating a second simulation image by superimposing the post-correction makeup image on a second image obtained by photographing a second face, based on the acquired correction information.

9. A makeup supporting method comprising:
storing, in a makeup information storage, makeup information including a first makeup information item including color information and area information indicating a first area defined by first makeup reference points;
acquiring facial feature points including first facial feature points from an image obtained by photographing a face;
setting first facial reference points to the image based on the acquired first facial feature points;
generating a simulation image by superimposing a makeup image on the image, the makeup image indicating a state in which makeup is applied to the face;
receiving correction of the makeup image included in the generated simulation image from a user; and
recording correction information which indicates a region of a post-correction makeup image using a relative position to the facial feature points
wherein the generating comprises:
generating a second area defined by the first facial reference points, such that the second area and the first area have a same relationship as a relationship between the first facial reference points and the first makeup reference points; and
painting the second area with a color indicated by the color information stored in the makeup information storage, to generate the simulation image, wherein, in the receiving of correction, the user changes an outline of the second area to generate a third area, the third area having the changed outline and having the color, and wherein the correction information includes information defining the difference between the second area and the third area.

10. A non-transitory computer-readable recording medium storing a program for causing a processor to perform operations comprising:
acquiring facial feature points including first facial feature points from an image obtained by photographing a face;
setting first facial reference points to the image based on the acquired first facial feature points;
generating a simulation image by superimposing a makeup image on the image, using a makeup information storage, the makeup image indicating a state in which makeup is applied to the face, wherein the makeup information storage stores makeup information including a first makeup information item including color information and area information indicating a first area defined by first makeup reference points;
receiving correction of the makeup image included in the generated simulation image from a user; and
recording correction information which indicates a region of a post-correction makeup image using a relative position to facial feature points,
wherein the generating comprises:
generating a second area defined by the first facial reference points, such that the second area and the first area have a same relationship as a relationship between the first facial reference points and the first makeup reference points; and
painting the second area with a color indicated by the color information stored in the makeup information storage, to generate the simulation image, wherein, in the receiving of correction, the user changes an outline of the second area to generate a third area, the third area having the changed outline and having the color, and wherein the correction information includes information defining the difference between the second area and the third area.

* * * * *